US012617104B2

(12) United States Patent
Zhang et al.

(10) Patent No.: US 12,617,104 B2
(45) Date of Patent: May 5, 2026

(54) SELF-ADAPTIVE MECHANICAL FOOT FOR LEGGED ROBOT AND WORKING METHOD THEREOF

(71) Applicant: SHANDONG UNIVERSITY, Jinan (CN)

(72) Inventors: Guoteng Zhang, Jinan (CN); Xianwu Zeng, Jinan (CN); Yibin Li, Jinan (CN); Xuewen Rong, Jinan (CN); Xin Ma, Jinan (CN); Rui Song, Jinan (CN); Xincheng Tian, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 754 days.

(21) Appl. No.: 17/945,355

(22) Filed: Sep. 15, 2022

(65) Prior Publication Data

US 2023/0098466 A1     Mar. 30, 2023

(30) Foreign Application Priority Data

Sep. 30, 2021     (CN) .......................... 202111158913.2

(51) Int. Cl.
*B25J 15/00* (2006.01)
*B62D 57/02* (2006.01)

(52) U.S. Cl.
CPC .......... *B25J 15/0019* (2013.01); *B62D 57/02* (2013.01)

(58) Field of Classification Search
CPC ..... B25J 15/0019; B62D 57/02; B62D 57/032
See application file for complete search history.

(56) References Cited

U.S. PATENT DOCUMENTS 6,082,290 A * 7/2000 Conlin ................... B25J 17/025
901/49

FOREIGN PATENT DOCUMENTS

CN          107628140 A  *  1/2018
CN          207374536 U  *  5/2018
WO     WO-2019047015 A1 *  3/2019  .............. B25J 19/00

* cited by examiner

*Primary Examiner* — William C Joyce
(74) *Attorney, Agent, or Firm* — Oliff PLC

(57) ABSTRACT

The present disclosure discloses a self-adaptive mechanical foot for the legged robot. The mechanical foot has a piston disposed inside a piston cylinder. The piston is connected to one end of each humeral plate, and the piston cylinder is connected to the other end of each humeral plate. The humeral plates perform opening and closing movement through the up-down movement of the piston in the piston cylinder. The humeral plates are connected to toes on the foot and drive the toes to open and close through the up-down movement. The mechanical foot provided by the present disclosure has higher standing stability and fast interaction response speed when interacting with the terrain. It can realize arbitrary and fast switching between a point-like foot and a planar foot, and meanwhile avoids collision between a support leg and a swing leg.

5 Claims, 2 Drawing Sheets a. the mechanical foot is suspended         b. the mechanical foot is supported

SELF-ADAPTIVE MECHANICAL FOOT FOR LEGGED ROBOT AND WORKING METHOD THEREOF

CROSS-REFERENCES TO RELATED APPLICATIONS

This application claims priority to Chinese Patent Application No. 2021111589132, filed on 30 Sep. 2021 with the Chinese Patent Office, the disclosure of which are hereby incorporated by reference herein in its entirety.

TECHNICAL FIELD

The present disclosure relates to the technical field of robots, and in particular relates to a self-adaptive legged robot mechanical foot and a working method thereof.

BACKGROUND

The description in this section merely provides background information related to the present disclosure and does not necessarily constitute the prior art. With the rapid development of legged robots, mechanical ankle joints play an important role in high-performance legged robots. When the robot walks fast, the ankle joints play a small role. At the moment, we hope that the robot has point-like feet, because pure dynamic walking can achieve relatively good maneuverability. However, when the robot stops, we hope that foot ends of the robot are planar, which provide multiple supports for stable standing of the robot. According to traditional methods, using active ankle joints needs to quickly detect the contact condition of the foot ends and switch the shape change of the foot ends. That is to say, the interaction of the active ankle joints with ground environment requires the robot to respond quickly, which poses a great challenge to control algorithms, driving and sensors. At the same time, if a plane is used as the foot ends of the robot, since the foot ends occupy a relatively large space while the robot is walking, collision between a support leg and a swing leg occurs easily, causing the robot to lose stability and fall to the ground.

That is, the current robot ankle joints have many problems and need to be improved. The inventor has found that the prior art at least has the following problems:
    a. the interaction response speed with terrain is slow;
    b. current passive ankle joints cannot realize arbitrary and fast switching between the point-like foot and the planar foot; and
    c. increasing the area of the foot ends is easy to cause collision between the support leg and the swing leg.

SUMMARY

In order to solve the above-mentioned problems, the present disclosure provides a self-adaptive legged robot mechanical foot and a working method thereof, which can achieve arbitrary and fact switching between a point-like foot and a planar foot.

In order to realize the above objectives, the present disclosure adopts the technical solutions as follows:

In a first aspect, the present disclosure provides a self-adaptive legged robot mechanical foot, including the following:

A piston is disposed in a piston cylinder. The piston is connected to one end of each humeral plate. The piston cylinder is connected to the other end of each humeral plate.

The humeral plates perform opening and closing movement through up-down movement of the piston in the piston cylinder. The humeral plates are connected to toes. The humeral plates drive the toes to perform up-down opening and closing movement through the opening and closing movement.

Further, a spring is disposed in the piston to play a role in buffering, and the stiffness coefficient of the spring can be changed to adapt to different response speeds and buffer intensity.

Further, further included are limiting blocks, disposed on the outer side of the piston cylinder, for preventing the toes and the humeral plates from being attached to the piston or the piston cylinder, and forming force singularity when the foot falls such that the toes cannot be opened normally.

Further, the outer surface of each limiting block is parallel to the corresponding humeral plate having the minimum angle with the piston cylinder.

Further, when the robot mechanical foot contacts the ground, the toe inclined to a leg-foot of the robot and contacting the ground before other toes of the mechanical foot is a first toe, the first toe forms a correcting effect on the legged robot.

Further, the correcting intensity of the first toe to the legged robot is adjusted by changing the elasticity of the material of the humeral plates.

Further, the outer layer of the mechanical foot is packaged with an integral elastic film, for preventing gravel and dust from entering a hinge part.

Further, the toe number of the mechanical foot is adjustable, the toe length of the mechanical foot is adjustable, and the angles between the toes and the piston are adjustable.

In a second aspect, the present disclosure provides a working method of a self-adaptive legged robot foot, including:

According to the contact condition between a foot end and the ground, a piston can move up and down in a piston cylinder to drive humeral plates to perform opening and closing movement and toes to perform up-down movement.

When the mechanical foot contacts the ground, a toe center is affected by the gravity of a robot such that the piston moves to the interior of the piston cylinder.

When the toes are opened under the extrusion of the humeral plates, the plurality of toes forms a plane to jointly support the robot.

Further,
    when the mechanical foot leaves the ground, since the toe center is not supported by the ground, the piston moves away from the piston cylinder under the effect of a spring and the gravity, and the toes contract upwards by a pulling force of the humeral plates.

Compared with the prior art, the present disclosure has the following beneficial effects:

The robot mechanical foot provided by the present disclosure has higher standing stability and fast interaction response speed with the terrain, can realize automatic and fast switching between the point-like foot and the planar foot, and meanwhile, avoids collision between a support leg and a swing leg. During a standing process, the action strength of the mechanical foot on the balance of the robot can also be adjusted by adjusting the elastic strength of the humeral plates. Similarly, the robot will obtain better flexibility. The mechanical foot can be provided with the plurality of toes, the number of the toes can be reduced, and the length of the toes and the directions of the toes and the piston can also be changed to adapt to different operational needs.

Advantages of the additional aspects will be set forth in part in the description below, parts of which will become apparent from the description below, or will be understood by the practice of the present disclosure.

BRIEF DESCRIPTION OF THE DRAWINGS

The accompanying drawings constituting a part of the present disclosure are used to provide a further understanding of the present disclosure. The exemplary examples of the present disclosure and descriptions thereof are used to explain the present disclosure, and do not constitute an improper limitation of the present disclosure.

Figure 1:
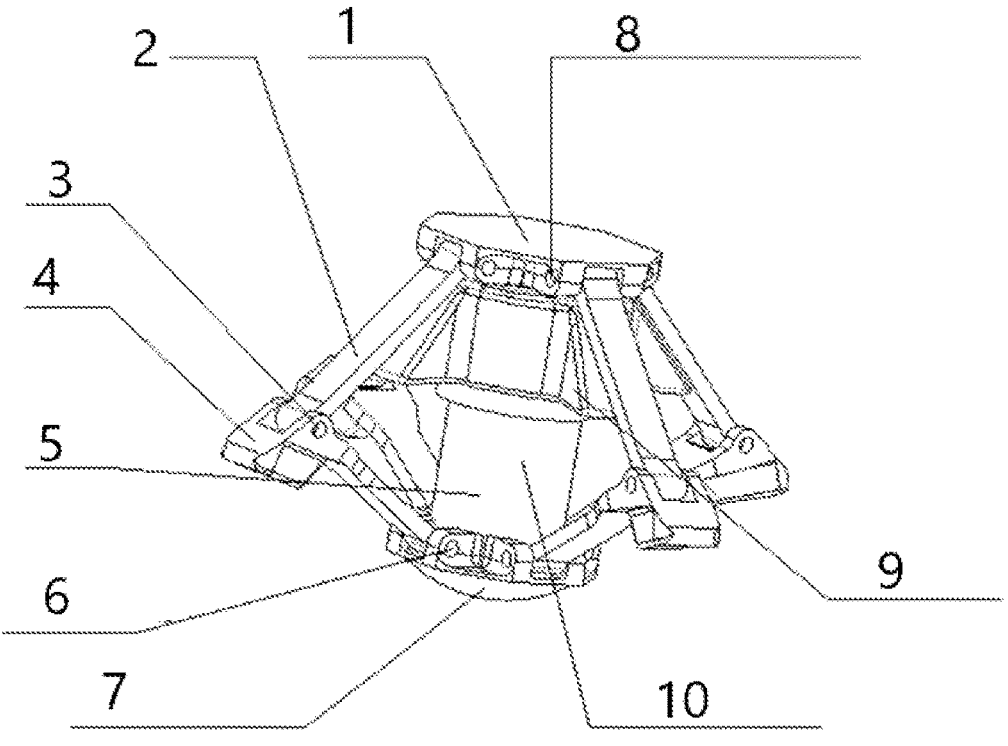
FIG. 1 is a schematic diagram of a structure of a mechanical foot provided by the example.

In which: 1, piston cylinder; 2, humeral plate; 3, digital joint hinge; 4, toe; 5, piston; 6, metacarpal joint hinge; 7, toe center; 8, proximal digital joint hinge; 9, limiting block; 10, internally mounted spring.

DETAILED DESCRIPTION

The present disclosure is further described below with reference to the accompanying drawings and examples.

It should be noted that, the following detailed descriptions are all exemplary, and are intended to provide further descriptions of the present disclosure. Unless otherwise specified, all technical and scientific terms used herein have the same meanings as those usually understood by a person of ordinary skill in the art to which the present disclosure belongs.

It should be noted that the terms used herein are merely used for describing specific implementations, and are not intended to limit exemplary implementations of the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

In the present disclosure, orientation or position relationships indicated by the terms such as "upper", "lower", "left", "right" "front", "rear", "vertical", "horizontal", "side", and "bottom" are based on orientation or position relationships shown in the accompanying drawings, and are merely relationship words that are determined for ease of describing the structural relationship between components or elements in the present disclosure, and are not intended to specifically refer to any component or element in the present disclosure. Therefore, such terms should not be construed as a limitation on the present disclosure.

In the present disclosure, terms such as "fixedly connected", "interconnection", and "connection" should be understood in a broad sense. The connection may be a fixing connection, an integral connection or a detachable connection; or the connection may be a direct connection, or an indirect connection by using an intermediary. Relevant scientific research or technical personnel in the art may determine the specific meanings of the foregoing terms in the present disclosure according to specific situations, and such terms should not be construed as a limitation on the present disclosure.

EXAMPLE 1

In a first aspect, the present disclosure provides a self-adaptive legged robot mechanical foot, including the following:

A piston 5 is disposed in a piston cylinder 1. The piston 5 is connected to one end of each humeral plate 2. The piston cylinder 1 is connected to the other end of each humeral plate 2. The humeral plates 2 perform opening and closing movement through up-down movement of the piston 5 in the piston cylinder 1. The humeral plates 2 are connected to toes 4. The humeral plates 2 drive the toes 4 to perform up-down opening and closing movement through the opening and closing movement. A spring 10 is disposed in the piston to play a role in buffering. Further included are limiting blocks 9, disposed on the outer side of the piston cylinder 1, for preventing the toes 4 and the humeral plates 2 from being attached to the piston or the piston cylinder 1, and forming force singularity when the foot falls such that the toes 4 cannot be opened. The outer surface of each limiting block 9 is parallel to the corresponding humeral plate 2 having the minimum angle with the piston cylinder 1. When the robot mechanical foot contacts the ground, the toe 4 inclined to a leg-foot of the robot and contacting the ground before other toes 4 of the mechanical foot is a first toe. The first toe forms a correcting effect on the legged robot. The correcting intensity of the first toe to the legged robot is adjusted by changing the elasticity of the material of the humeral plates 2. The outer layer of the mechanical foot is packaged with an integral elastic film, preventing gravel and dust from entering a hinge part. The toe number of the mechanical foot is adjustable, the toe length of the mechanical foot is adjustable, and the angles between the toes 4 and the piston 5 are adjustable.

Specifically, the piston 5 moves up and down in the piston cylinder 1, driving the humeral plates 2 and the toes 4 to perform opening and closing movement. When a foot mounted with the mechanical foot contacts the ground, a toe center 7 is affected by the gravity of the robot such that the piston 5 moves to the interior of the piston cylinder 1, the toes 4 are opened under the extrusion of the humeral plates 2 at the moment, and the four toes 4 form a plane to jointly support the robot. The spring 10 in the piston 5 plays a certain role in buffering. When the foot is raised to serve as a swing leg, the toes 4 contract upwards by a pulling force of the humeral plates 2 since the toe center 7 is not supported by the ground, the piston 5 moves away from the piston cylinder 1 under the effect of the spring 10 and the gravity. At the moment, the toe center 7 is protruded to move as a point-like foot, and meanwhile, the toe plane is reduced to avoid the collision between the feet.

The limiting blocks 9 work when the leg is raised to prevent the toes 4 and the humeral plates 2 from are attached to the piston 5 or the piston cylinder 1. The toes 4 cannot be opened again force singularity are formed when the foot falls next time. The outer surface of each limiting block 9 is parallel to the corresponding humeral plate 2 having the minimum angle with the piston cylinder 1.

During the process of the leg from suspending in the air to the ground, the toe 4 inclined to the leg contacts the ground before the other toes 4, forming a correcting effect on the robot. The correcting intensity can be adjusted by changing the elasticity of the material of the humeral plates 2.

In order to enable the mechanical foot to be available in the environment with more gravel, the whole mechanical foot can be packaged with a film with certain elasticity, preventing the gravel or dust from entering the hinge and key parts.

During a standing process, the action strength of the mechanical foot on the balance of the robot can also be adjusted by adjusting the elastic strength of the humeral plates 2. Similarly, the robot will obtain better flexibility.

The mechanical foot can be provided with the plurality of toes 4, the number of the toes 4 can also be reduced, and the length of the toes 4 and the directions of the toes 4 and the piston 5 can also be changed to adapt to different operational needs.

EXAMPLE 2

A working method of a self-adaptive legged robot mechanical foot, including:

A piston 5 can move up and down in a piston cylinder 1 to drive humeral plates 2 to perform opening and closing movement and toes 4 to perform up-down movement. When a mechanical foot contacts the ground, a toe center 7 is affected by the gravity of the robot such that the piston 5 moves to the interior of the piston cylinder 1. The toes 4 are opened under the extrusion of the humeral plates 2. The plurality of toes 4 forms a plane to jointly support a robot. When the mechanical foot leaves the ground, since the toe center 7 is not supported by the ground, the piston 5 moves away from the piston cylinder 1 under the effect of a spring 10 and the gravity. The toes 4 contract upwards by a pulling force of the humeral plates 2.

Figure 2:
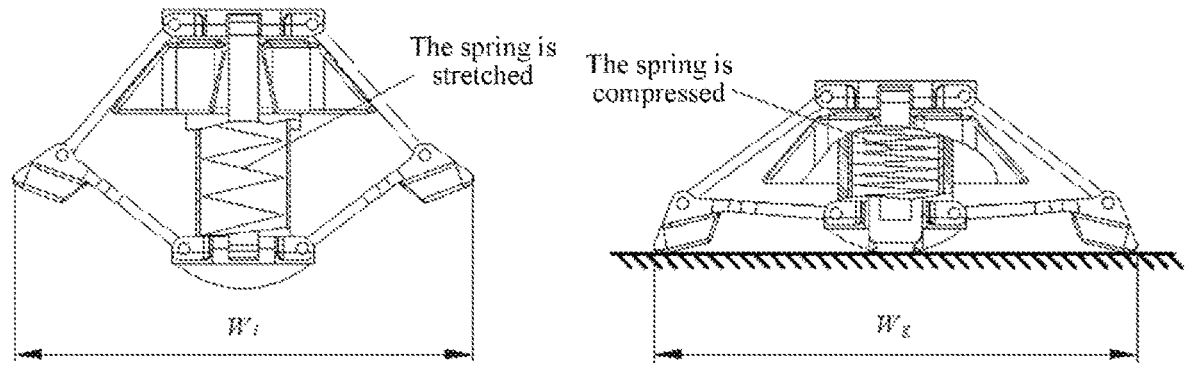
FIG. 2 is two working mode diagrams of a mechanical foot provided by the example.

Specifically, as shown in FIG. 2, the shown toe 4 is suspended, that is, when the leg of the robot is in a swing phase, the spring 10 in the piston 5 relaxes such that the piston 5 moves outward, the distance between the ends of toes 4 is reduced to the minimum distance W_l, and the swing leg occupies less space at the moment, thereby reducing the risk of the leg colliding with other legs. When the mechanical foot is in a support phase, as shown in FIG. 2, the spring 10 in the piston 5 is compressed, all toes 4 of the mechanical foot are opened, the distance between the ends of the toes 4 reach the maximum distance W_g, and all the toes 4 contact the ground to form a multi-point support, achieving a planar support effect, and increasing the standing stability of the robot.

Figure 3:
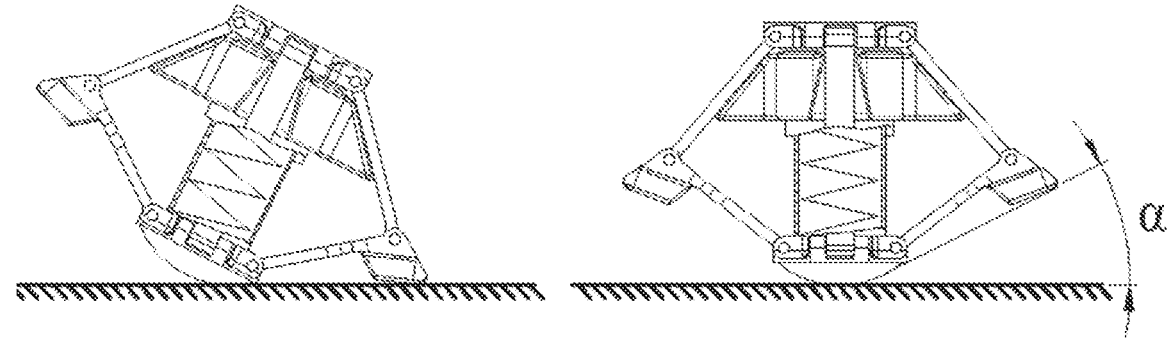
FIG. 3 is a schematic diagram of a mechanical foot contacting the ground provided by the example.

As shown in FIG. 3, during the process of the mechanical foot from suspending in the air to the ground, within the range of a certain included angle formed between the mechanical foot and the ground, the toe center 7 contacts the ground at first, and the effect of the point-like feet of the robot can be achieved at the moment. The angle range is controlled to be less than the maximum angle α, and the maximum angle α can be changed by adjusting the lengths of the humeral plates 2 and the toes 4 and the shape of the limiting blocks 9. As the mechanical foot moves downward, the spring 10 is compressed, and the mechanical foot then contacts the ground and gradually plays a role in adjusting the posture of the mechanical foot. Meanwhile, the spring 10 plays a role in buffering during the compression process. But the stiffness of the spring 10 should not be too large, because moment formed by the spring 10 and the toe 4 ends of the mechanical foot during a standing phase of the mechanical foot is opposite to the direction of the mechanical foot supported robot, and the support stability of the mechanical foot to the robot during the standing phase may be reduced due to the excessive spring stiffness.

Figure 4:
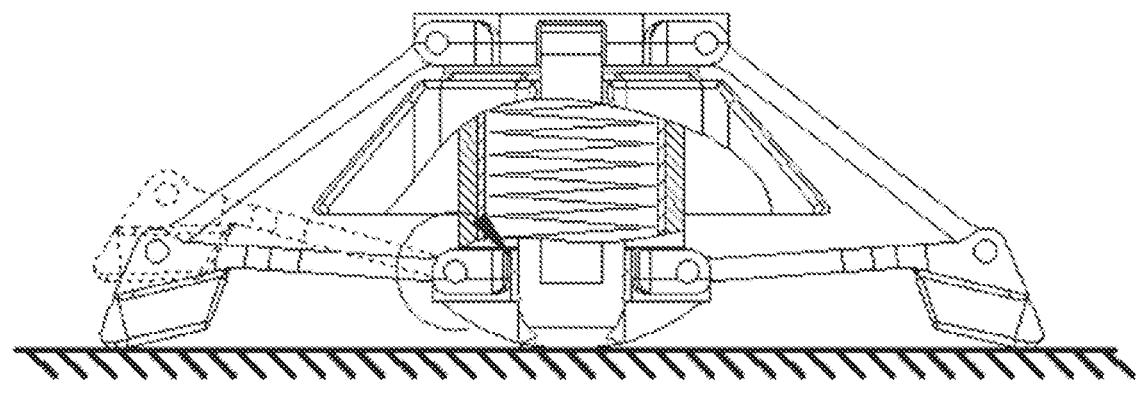
FIG. 4 is a schematic diagram of a mechanical foot leaving the ground provided by the example.

As shown in FIG. 4, when the mechanical foot leaves the ground, the direction of movement of the toes 4 is to lift the toes 4 upward. If the toes 4 are of a hook-toe type, the direction of releasing the toes 4 is just to lift the toes 4 outward and upward, and the situation that toes 4 are hooked on the ground and cannot be released is avoided. On the contrary, the process of contacting the ground is also the process of stretching the toes 4 to the ground through a reverse process, which is not easily affected by ground factors.

It should be noted that the self-adaptive legged robot mechanical foot provided by the present disclosure is a structural solution. As far as each equipment unit involved therein, specific structures for realizing respective functions to be realized have already existed in the prior art, and protocols, software or programs involved in work processing therebetween have also already existed in the prior art. Those skilled in the art are fully aware that the present disclosure is not any improvement on each equipment unit, so the content of the software is not involved, but an integral whole is provided by relying on the organic integration and integration of each component, that is, the structural solution is provided.

The specific implementations of the present disclosure are described above with reference to the accompanying drawings, but are not intended to limit the protection scope of the present disclosure. A person skilled in the art should understand that various modifications or deformations may be made without creative efforts based on the technical solutions of the present disclosure, and such modifications or deformations shall fall within the protection scope of the present disclosure.

What is claimed is:

1. A mechanical foot of a legged robot, comprising:
a piston, disposed in a piston cylinder;
a plurality of humeral plates;
a plurality of toes;
    wherein, a first end of each of the humeral plates is connected to the piston cylinder through a proximal digital joint hinge, a second end of the each of the humeral plates is connected to a first end of a corresponding one of the toes through a digital joint hinge, and a second end of each of the toes is connected to the piston through a metacarpal joint hinge;
    wherein, the humeral plates perform opening and closing movements through up and down movements of the piston in the piston cylinder; and the toes perform up-down opening and closing movements through the opening and closing movements by driving by the humeral plates;
a plurality of limiting blocks, being configured to move with the piston and prevent the humeral plates from engaging an outer surface of the piston cylinder, and form force singularity when the mechanical foot falls such that the toes cannot be opened; and
a toe center part, being arranged at a bottom of the piston;
    wherein, when the mechanical foot contacts the ground, one of the toes being inclined to a leg of the legged robot and contacting the ground before others of the toes of the mechanical foot is defined as a first toe.

2. The mechanical foot of the legged robot according to claim 1, wherein a spring is disposed in the piston, to play a role in resetting and buffering.

3. The mechanical foot of the legged robot according to claim 1, wherein an outer surface of each of the plurality of limiting blocks is parallel to the corresponding humeral plate having the minimum angle with the piston cylinder.

4. A working method of the mechanical foot of the legged robot according to claim 1, comprising:

enabling the piston to move up and down in the piston cylinder, and driving the humeral plates to perform the opening and closing movements and the toes to perform the up-down opening and closing movements;

when the mechanical foot contacts the ground, the toe center part being affected by the gravity of the legged robot such that the piston moves along an interior of the piston cylinder; and when the toes are opened during extension of the humeral plates, the plurality of the toes forming a plane to jointly support the legged robot.

5. The working method of the mechanical foot of the legged robot according to claim 4, wherein when the mechanical foot leaves the ground, since the toe center part is not supported by the ground, the piston moves away from the piston cylinder under an effect of a spring and the gravity, and the toes contract upwards by a pulling force of the humeral plates.

\* \* \* \* \*